(12) United States Patent
Karlsen et al.

(10) Patent No.: US 8,575,938 B2
(45) Date of Patent: Nov. 5, 2013

(54) ELECTRICAL POWER SYSTEM FOR TOWED ELECTROMAGNETIC SURVEY STREAMERS

(75) Inventors: Kenneth Karlsen, Aalesund (NO); Ulf Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 332 days.

(21) Appl. No.: 12/799,188

(22) Filed: Apr. 20, 2010

(65) Prior Publication Data

US 2011/0255366 A1    Oct. 20, 2011

(51) Int. Cl.
*G01V 3/00* (2006.01)
*G01V 3/02* (2006.01)
*G01S 1/72* (2006.01)
*H02G 3/00* (2006.01)

(52) U.S. Cl.
USPC ........... 324/365; 324/347; 324/354; 324/323; 324/357; 367/117; 174/70 R

(58) Field of Classification Search
USPC ......................................................... 324/365
See application file for complete search history.

(56) References Cited

U.S. PATENT DOCUMENTS

| | | | | |
|---|---|---|---|---|
| 2,839,721 A * | 6/1958 | De Witte | ........................ | 324/365 |
| 2,872,638 A * | 2/1959 | Jones | ........................ | 324/365 |
| 3,182,250 A * | 5/1965 | Mayes | ........................ | 324/365 |
| 3,273,110 A * | 9/1966 | Monroe et al. | ................ | 340/852 |
| 3,987,354 A * | 10/1976 | Mason | ......................... | 320/143 |
| 4,041,442 A * | 8/1977 | Marquardt | .................... | 367/135 |
| 4,503,526 A * | 3/1985 | Beauducel et al. | ............. | 367/20 |
| 4,507,735 A * | 3/1985 | Moorehead et al. | ............. | 702/9 |
| 4,617,518 A * | 10/1986 | Srnka | ............................ | 324/365 |
| 5,032,794 A * | 7/1991 | Ridd et al. | ..................... | 324/365 |
| 5,126,666 A * | 6/1992 | van Heyningen | ............. | 324/244 |
| 5,459,695 A * | 10/1995 | Manison | .......................... | 367/18 |
| 6,114,855 A * | 9/2000 | Petrovich et al. | ............. | 324/357 |
| 6,236,211 B1 * | 5/2001 | Wynn | ............................ | 324/365 |
| 6,236,212 B1 * | 5/2001 | Wynn | ............................ | 324/365 |
| 6,320,386 B1 * | 11/2001 | Balashov et al. | ............. | 324/357 |
| 6,777,940 B2 * | 8/2004 | Macune | ......................... | 324/338 |
| 7,054,230 B1 * | 5/2006 | Nelson | .......................... | 367/131 |
| 7,411,399 B2 * | 8/2008 | Reddig et al. | ................. | 324/329 |
| 7,446,535 B1 | 11/2008 | Tenghamn et al. | | |
| 7,548,486 B2 | 6/2009 | Tenghamn | | |
| 7,602,191 B2 * | 10/2009 | Davidsson | .................... | 324/347 |

(Continued)

FOREIGN PATENT DOCUMENTS

EP    2204673 A2    7/2010
WO    2009032274 A1    3/2009

OTHER PUBLICATIONS

Reed, D.G. Editor, The ARRL Handbook for Radio Communications 2005 , ARRL—the national association for Amatuer Radio, Eighty Second Edition, Section 17.12.*

(Continued)

*Primary Examiner* — Jermele M Hollington
*Assistant Examiner* — Christopher McAndrew

(57) ABSTRACT

A marine electromagnetic receiver cable includes a plurality of signal processing modules disposed at spaced apart locations along the receiver cable. A power supply line is connected to each of the signal processing modules and to an electric current source. A current regulation device is connected in the power supply line proximate each signal processing module. The current regulation devices are connected such that an amount of current flowing through the power supply line is substantially constant. At least one electromagnetic receiver is functionally coupled to an input of each signal processing module.

22 Claims, 2 Drawing Sheets

(56) References Cited

U.S. PATENT DOCUMENTS

| | | | |
|---|---|---|---|
| 7,642,784 B2* | 1/2010 | Reddig et al. | 324/329 |
| 7,671,598 B2 | 3/2010 | Ronaess et al. | |
| 7,693,005 B2 | 4/2010 | Stenzel et al. | |
| 8,063,642 B2* | 11/2011 | Ziolkowski | 324/365 |
| 8,115,491 B2* | 2/2012 | Alumbaugh et al. | 324/365 |
| 8,134,369 B2* | 3/2012 | Helwig | 324/365 |
| 8,143,897 B2* | 3/2012 | Ziolkowski | 324/365 |
| 8,151,907 B2* | 4/2012 | MacDonald | 175/95 |
| 2004/0027130 A1* | 2/2004 | Ellingsrud et al. | 324/334 |
| 2006/0022525 A1 | 2/2006 | Landry | |
| 2009/0001987 A1* | 1/2009 | Davidsson | 324/347 |
| 2009/0140741 A1 | 6/2009 | Tenghamn et al. | |
| 2009/0147619 A1 | 6/2009 | Welker | |
| 2010/0017133 A1 | 1/2010 | Ziolkowski et al. | |
| 2010/0045296 A1 | 2/2010 | Tenghamn | |
| 2012/0223718 A1* | 9/2012 | Peppe et al. | 324/365 |
| 2013/0093426 A1* | 4/2013 | Peppe et al. | 324/365 |

OTHER PUBLICATIONS

D.G. Wenham, The Design of Direct Voltage and Current Stabilizers using Semiconductor Devices, Apr. 1960, Paper No. 3141 E, The Institution of Electrical Engineers, pp. 1384-1393.*

The ARRL Handbook for Radio Communications, Copyright 2004-2005, ARRL (The national association for Amatuer Radio), 82nd Edition, Pages or Sections 17.12 to 17.13.*

D. G. Wenham, The Design of Direct Voltage and Current Stabilizers Using Semiconductor Devices, Apr. 1960, The Institution of Electrical Engineers Paper No. 3141 E, pp. 1384-1393.*

Dana G. Reed, Editor, The ARRL Handbook for Radio Communications, 2005, ARRL—the national association for Amateur Radi, Newington, CT 06111 USA, p. 17.12.*

Wenham, D.G., The Design of Direct Voltage and Current Stabilizers Using Semiconductor Devices, Apr. 1960, The Institution of Electrical Engineers, Paper No. 3141 E, pp. 1390-1391.*

Reed, D.G. Editor, The ARRL Handbook for Radio Communications 2005, ARRL—the national association for Amatuer Radio, Eighty Second Edition, Section 17.12.*

SeaTRAK™ 12 Channel and SeaMAX™ 16 Channel, Digitizing Modules, downloaded from www.hydrosciencetech.com/seamax16.html on Sep. 2, 2010.

SeaMUX™ 12 and 24 Channel, Digitizing Modules, www.hydrosciencetech.com/seamax24.html on Sep. 2, 2010.

* cited by examiner

ELECTRICAL POWER SYSTEM FOR TOWED ELECTROMAGNETIC SURVEY STREAMERS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates generally to the field of marine electromagnetic surveying. More particularly, the invention relates to electrical power systems used in cable type marine electromagnetic survey systems.

BACKGROUND OF THE INVENTION

Cable type electromagnetic (EM) survey systems include various electromagnetic field measurement devices, for example, spaced apart electrode pairs, magnetic field sensors, magnetometers and the like, disposed at spaced apart locations along a streamer cable. The cable may be towed behind a vessel or may be disposed on the bottom of a body of water. The measuring devices detect various components of an electromagnetic field resulting from imparting a time varying electromagnetic field into rock formations below the bottom of the body of water. The measurement devices typically have signal processing components such as amplification and communication electronics disposed proximate each such measurement device. Such electronics may include amplifiers and analog-to-digital converters or electrical-to-optical converters to communicate a representation of the measurements to a recording system on the vessel or elsewhere.

The amplification and communication devices, which are distributed over the length of the streamer cable, consume electrical power. The front-end (preamplification stage) in particular of such devices have substantial sensitivity to low frequency noise originating in the power distribution system. Methods known in the art for attenuating electromagnetic interference (EMI) originating in the power system using various types of suppressors (e.g., capacitive shunts and series connected ferrites) have little effect in the frequency range of interest for marine EM hydrocarbon exploration.

In a typical constant voltage cable power distribution system, noise may originate from current surges caused by variable load power consuming devices in the measurement system (e.g., telemetry units). The noise transfers to the amplification front-end either through the electric power lines or by inductive coupling to the electric or magnetic field sensors. One known method for suppressing this type of noise is to use a battery powered system. See, for example, U.S. Pat. No. 7,602,191 issued to Davidsson and commonly owned with the present invention. However, battery installation in the streamer cable is a drawback from a maintenance and weight point of view. It is difficult to obtain neutral buoyancy when batteries are included in the streamer. Battery powered streamers also have limited acquisition time because measurements should be avoided while charging the batteries.

There continues to be a need for improved electromagnetic streamer power systems in order to reduce noise in the recording of electromagnetic signal data.

SUMMARY OF THE INVENTION

A marine electromagnetic receiver cable according to one aspect of the invention includes a plurality of signal processing modules disposed at spaced apart locations along the receiver cable. A power supply line is connected to each of the signal processing modules and to an electric current source. A current regulation device is connected in the power supply line proximate each signal processing module. The current regulation devices are connected such that an amount of current flowing through the power supply line is substantially constant. At least one electromagnetic receiver is functionally coupled to an input of each signal processing module.

Other aspects and advantages of the invention will be apparent from the following description and the appended claims.

DETAILED DESCRIPTION

Figure 1:
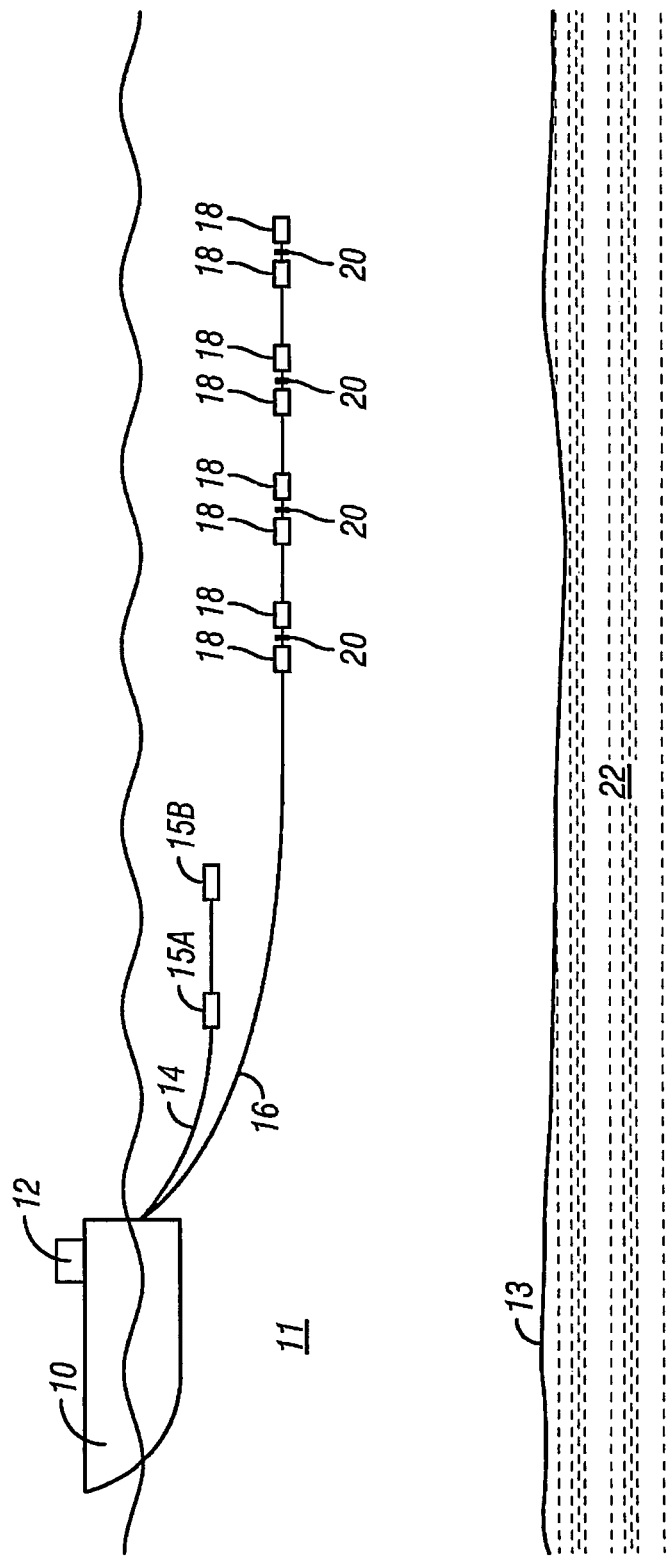
FIG. 1 shows an example towed marine electromagnetic sensor streamer.

FIG. 1 shows an example marine electromagnetic survey system that can be used with an electrical power distribution system according to the invention. A survey vessel 10 moves along the surface of a body of water 11 such as a lake or the ocean. The survey vessel 10 may include thereon equipment, shown generally at 12 and referred to for convenience as a "recording system." The recording system 12 includes devices (none shown separately for clarity of the illustration) for navigating the vessel, for passing electrical current through an electromagnetic transmitter (explained below) and for receiving and recording signals generated by various electromagnetic receivers (explained below). The recording system 12 may also provide electrical power for various components (explained below) in a receiver streamer cable 16.

The transmitter in the present example may be an electric field transmitter. The transmitter may consist of an electrically insulated transmitter cable 14 towed by the survey vessel 10 or by another vessel. The transmitter cable 14 may include a pair of spaced apart electrodes 15A, 15B. At selected times, the recording system 12 imparts electrical current across the electrodes 15A, 15B to induce an electromagnetic field in the water 11 and in the rock formations 22 below the water bottom 13.

It will be apparent to those skilled in the art that the present invention is not limited to using pairs of electrodes, such as 15A and 15B, as a transmitter. Wire loops or coils may also have current passed therethrough to include a time varying magnetic field in the water 11 and formations 22.

The receivers in the present example may be pairs of spaced apart electrodes 18 disposed at spaced apart locations along the receiver streamer cable 16. The electrodes measure electric field response to the electromagnetic field imparted by the transmitter. In the present example, each pair of electrodes may be associated with a signal processing module 20. Each such module 20 may include electrical circuitry (see FIG. 2) for amplifying the signals from the electrodes 18 and communicating the amplified signals to the recording system 12.

It will be appreciated by those skilled in the art that a number of components ordinarily forming part of a marine streamer cable are not shown in the present example for clarity of the illustration. Such components would include a water tight jacket surrounding the exterior of the streamer cable, at least one strength member extending the length of the cable to transfer axial load of towing, and buoyancy spacers to provide the streamer cable with a selected (typically near neutral) buoyancy in water.

In order to reduce noise induced in the measurements resulting from the power distribution system, in one example the present invention includes signal processing modules 20 that may be considered "ideal", or substantially constant power consumers. By making each module 20 a substantially constant power consumer, low frequency power surges that are typical for a constant voltage system are substantially reduced. A way to implement each module to be a substantially constant power consumer is to connect the module electronics for all modules along the receiver cable in a substantially constant current loop where the power for each module's circuits is extracted over a reverse-biased Zener diode. The well-defined Zener diode voltage acts as a stable voltage reference over which the supply voltage for the particular module is extracted. The time variations in the current consumption of the electronic circuits in each module are dynamically compensated by the Zener diode installation creating an "ideal" power consumer. The current is substantially constant in the system because it either passes through the measurement electronics or the Zener diode. A substantially constant current power loop may also be implemented using a precision power shunt regulator at each module in substitution of the Zener diode. Such regulators can provide more control over the current regulation than the Zener diode implementation.

Figure 2:
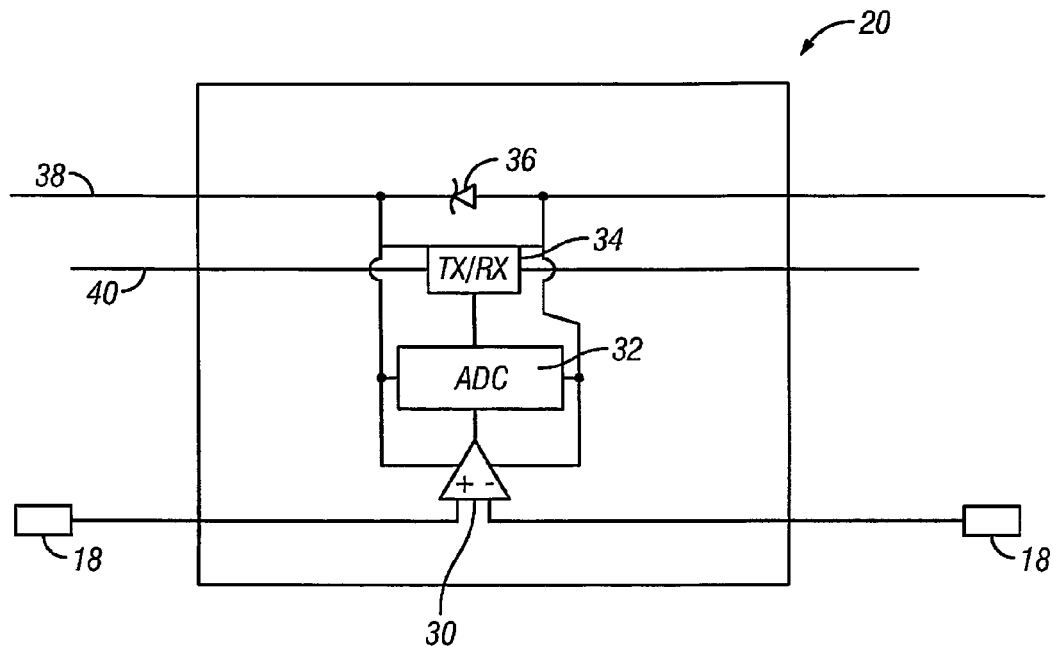
FIG. 2 shows a more detailed view of any example signal processing module in the streamer of FIG. 1.

An example of one of the signal processing modules 20 can be observed in FIG. 2 in more detail. The modules 20 may be disposed in the receiver cable (16 in FIG. 1) at spaced apart locations, and as explained with reference to FIG. 1, may each be associated with an electromagnetic signal receiver. In the present example, the electromagnetic receiver can be a pair of spaced apart electrodes 18. Each of the electrodes is coupled to an input of a preamplifier 30 associated with the module 20. A signal corresponding to the voltage difference across the electrodes is output from the preamplifier 30. In the present example, the output of the preamplifier 30 may be conducted to an analog to digital converted (ADC) 32 which converts the analog voltage signals into digital form. A digital transceiver (TX/RX) 34 communicates the digitized measurements to the recording system (12 in FIG. 1) over a suitable signal line 40. Alternatively, the signals may be converted to optical signals using an electrical to optical converter (not shown) and communicated to the recording unit using an optical fiber (not shown). Electrical power to operate the foregoing components of the module may be supplied by an electrical power conductor 38 extending the length of the streamer cable. To create a substantially constant current power circuit, as explained above, the electrical power may be extracted from the electrical power conductor 38 across the terminals of a reverse-biased Zener diode 36. The foregoing arrangement, repeated for each module, provides substantially constant current flowing in the electrical power supply system. Such substantially constant current reduces noise induced in the measurement system.

It will be appreciated by those skilled in the art that types of electromagnetic receivers other than pairs of spaced apart electrodes 18 may be used, for example, wire loops or magnetometers. The scope of the invention is not limited to spaced apart electrodes as electromagnetic receivers. It should also be understood that a plurality of laterally spaced apart receiver streamer cables may be towed in the water simultaneously by the survey vessel or by another vessel.

Figure 3:
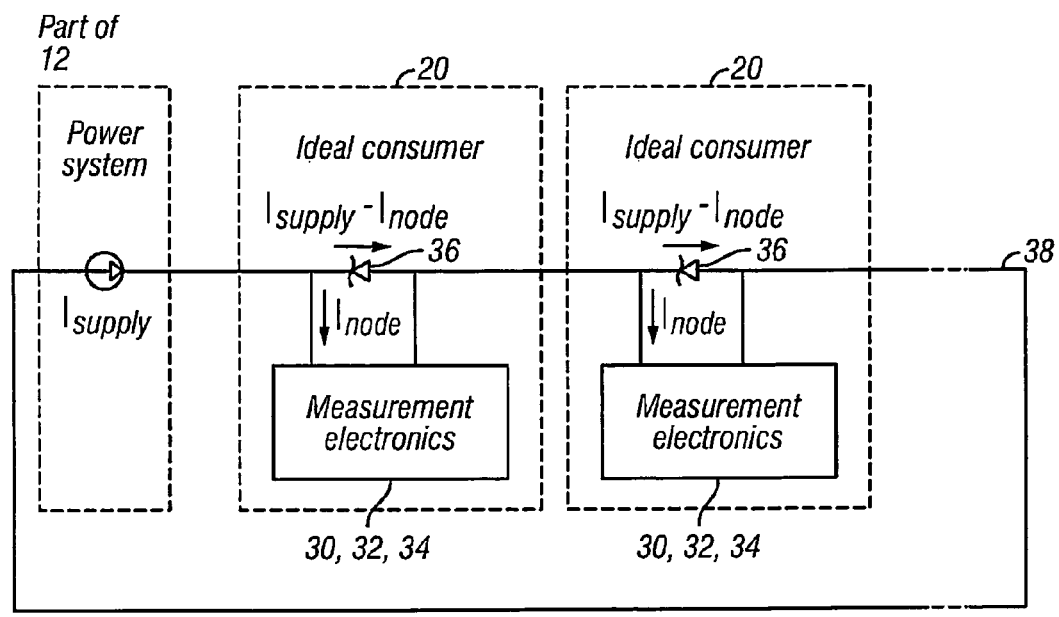
FIG. 3 shows an example constant power circuit for two or more modules along a streamer.

An example substantially constant current system using a plurality of modules is shown in FIG. 3. The power supply conductor 38 extends the length of the receiver cable. The power to be conducted over the line 38 may be supplied by the recording unit (12 in FIG. 1) or by a power distribution device (not shown) disposed near the forward end of the streamer cable. Each module 20 is shown with its associated signal processing devices (30, 32, 34 in FIG. 2) and the associated Zener diode 36 to provide power takeoff from the electrical power conductor 38. The foregoing arrangement may be repeated for as many modules as are present in the streamer cable (16 in FIG. 1).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic receiver cable, comprising:
   one or more signal processing modules disposed at spaced apart locations along the receiver cable;
   a single power supply line connected to each of the signal processing modules and configured to be connected to an electric current source;
   a current regulation device connected in the power supply line proximate each signal processing module such that an amount of current flowing through the power supply line is substantially constant; and
   at least one electromagnetic receiver functionally coupled to an input of each signal processing module.

2. The cable of claim 1 wherein the at least one electromagnetic receiver comprises a pair of spaced apart electrodes.

3. The cable of claim 1 wherein the current regulation device comprises a reverse-biased Zener diode.

4. The cable of claim 1 wherein the current regulation device comprises a power shunt regulator.

5. A method for marine electromagnetic surveying, comprising:
   towing an electromagnetic field transmitter in a body of water;
   towing at least one electromagnetic receiver streamer cable in the water, the streamer cable comprising:
   one or more signal processing modules disposed at spaced apart locations along the receiver cable;
   a single power supply line connected to each of the signal processing modules and configured to be connected to an electric current source;
   a current regulation device connected in the power supply line proximate each signal processing module such that an amount of current flowing through the power supply line is substantially constant; and
   at least one electromagnetic receiver functionally coupled to an input of each signal processing module;
   actuating the electromagnetic field transmitter at selected times; and
   communicating signals detected by the electromagnetic receivers to a recording system.

6. The method of claim 5 wherein the at least one electromagnetic receiver comprises a pair of spaced apart electrodes.

7. The method of claim 5 wherein the current regulation device comprises a reverse-biased Zener diode.

8. The method of claim 5 wherein the current regulation device comprises a power shunt regulator.

9. The cable of claim 1 wherein each signal processing module comprises a preamplifier coupled to the at least one electromagnetic receiver and an analog to digital converter coupled to an output of the preamplifier.

10. The cable of claim 9 wherein each signal processing module further comprises an electrical to optical signal converter coupled to an output of the analog to digital converter.

11. The method of claim 5 wherein each signal processing module comprises a preamplifier coupled to the at least one electromagnetic receiver and an analog to digital converter coupled to an output of the preamplifier.

12. The method of claim 11 wherein each signal processing module further comprises an electrical to optical signal converter coupled to an output of the analog to digital converter.

13. A marine electromagnetic survey system comprising:
an electric current source disposed on a survey vessel;
at least one marine electromagnetic receiver cable connected to the survey vessel, each receiver cable comprising:
one or more signal processing modules disposed at spaced apart locations along the receiver cable;
a single power supply line connected to each of the signal processing modules and to the electric current source;
a current regulation device connected in the power supply line proximate each signal processing module such that an amount of current flowing through the power supply line is substantially constant; and
at least one electromagnetic receiver functionally coupled to an input of each signal processing module.

14. The system of claim 13 wherein the at least one electromagnetic receiver comprises a pair of spaced apart electrodes.

15. The system of claim 13 wherein the current regulation device comprises a reverse-biased Zener diode.

16. The system of claim 13 wherein the current regulation device comprises a power shunt regulator.

17. The system of claim 13 further comprising a current regulation device connected in the power supply line proximate each signal processing module, the current regulation devices connected such that an amount of current flowing through the power supply line is substantially constant.

18. The system of claim 13 wherein each signal processing module comprises a preamplifier coupled to the at least one electromagnetic receiver, an analog to digital converter coupled to an output of the preamplifier, and an electrical to optical signal converter coupled to an output of the analog to digital converter.

19. A marine electromagnetic receiver cable, comprising:
one or more signal processing modules disposed at spaced apart locations along the receiver cable;
a single power supply line connected to each of the signal processing modules and configured to be connected to an electric current source;
a reverse biased zener diode connected in the power supply line proximate each signal processing module such that an amount of current flowing through the power supply line is substantially constant; and
at least one electromagnetic receiver functionally coupled to an input of each signal processing module.

20. A marine electromagnetic receiver cable, comprising:
one or more signal processing modules disposed at spaced apart locations along the receiver cable;
a single power supply line connected to each of the signal processing modules and configured to be connected to an electric current source;
a power shunt regulator connected in the power supply line proximate each signal processing module such that an amount of current flowing through the power supply line is substantially constant; and
at least one electromagnetic receiver functionally coupled to an input of each signal processing module.

21. A method for marine electromagnetic surveying, comprising:
towing an electromagnetic field transmitter in a body of water;
towing at least one electromagnetic receiver streamer cable in the water, the streamer cable comprising:
one or more signal processing modules disposed at spaced apart locations along the receiver cable;
a single power supply line connected to each of the signal processing modules and configured to be connected to an electric current source;
a reverse biased zener diode connected in the power supply line proximate each signal processing module such that an amount of current flowing through the power supply line is substantially constant; and
communicating signals detected by the electromagnetic receivers to a recording system.

22. A method for marine electromagnetic surveying, comprising:
towing an electromagnetic field transmitter in a body of water;
towing at least one electromagnetic receiver streamer cable in the water, the streamer cable comprising:
one or more signal processing modules disposed at spaced apart locations along the receiver cable;
a single power supply line connected to each of the signal processing modules and configured to be connected to an electric current source;
a power shunt regulator connected in the power supply line proximate each signal processing module such that an amount of current flowing through the power supply line is substantially constant; and
communicating signals detected by the electromagnetic receivers to a recording system.

* * * * *